US 12,492,752 B2

(12) United States Patent
Bertani et al.

(10) Patent No.: US 12,492,752 B2
(45) Date of Patent: Dec. 9, 2025

(54) MOVEMENT CONTROL VALVE

(71) Applicant: VALVOLE ITALIA S.R.L., Carpi (IT)

(72) Inventors: Marcello Bertani, Carpi (IT); Andrea Storci, Nonantola (IT)

(73) Assignee: VALVOLE ITALIA S.R.L., Carpi (IT)

(*) Notice: Subject to any disclaimer, the term of this patent is extended or adjusted under 35 U.S.C. 154(b) by 0 days.

(21) Appl. No.: 18/599,521

(22) Filed: Mar. 8, 2024

(65) Prior Publication Data
US 2025/0283535 A1 Sep. 11, 2025

(51) Int. Cl.
*F16K 1/12* (2006.01)
*F16K 1/42* (2006.01)
*F16K 31/122* (2006.01)

(52) U.S. Cl.
CPC .............. *F16K 1/126* (2013.01); *F16K 1/42* (2013.01); *F16K 31/1221* (2013.01)

(58) Field of Classification Search
CPC ......... F16K 1/126; F16K 1/42; F16K 31/1221
See application file for complete search history.

(56) References Cited

U.S. PATENT DOCUMENTS

| 3,792,715 | A | 2/1974 | Parrett et al. | |
| 6,932,318 | B2 * | 8/2005 | Igarashi | F16K 31/1221 251/63.4 |
| 8,752,807 | B2 | 6/2014 | Nomichi et al. | |
| 11,927,275 | B2 * | 3/2024 | Hayama | F16K 31/1221 |
| 2009/0065727 | A1 | 3/2009 | Nomichi et al. | |
| 2016/0195114 | A1 | 7/2016 | Schneider et al. | |
| 2019/0077388 | A1 * | 3/2019 | Lee | F16J 15/164 |
| 2023/0375066 | A1 * | 11/2023 | Higashidozono | F16K 1/42 |

FOREIGN PATENT DOCUMENTS

| EP | 1860357 | | 11/2007 | |
| EP | 2834544 | | 2/2015 | |
| GB | 678539 | A * | 9/1950 | F16K 11/16 |

OTHER PUBLICATIONS

Italian Search Report issued Oct. 19, 2023 in IT 20230004584, 6 pages.

* cited by examiner

*Primary Examiner* — Umashankar Venkatesan
(74) *Attorney, Agent, or Firm* — Chrisman Gallo Tochtrop LLC

(57) ABSTRACT

Movement control valve of the parts-in-body type having a housing that includes a loading opening, an unloading opening, a pilot opening and an installation opening;—a sealing seat slidable along the housing, which delimits a passage that places the loading opening in communication with the unloading opening;—a shutter slidable along the housing between a closed position, in which it is in contact with the sealing seat and blocks the passage, and an open position, in which it is moved away from the sealing seat;—a first elastic means disposed to push the sealing seat towards the shutter; and—an abutment element removably fixed in the housing and configured so as to define an abutment in contact with which the sealing seat is disposed as a result of the push exerted by the first elastic means.

10 Claims, 1 Drawing Sheet

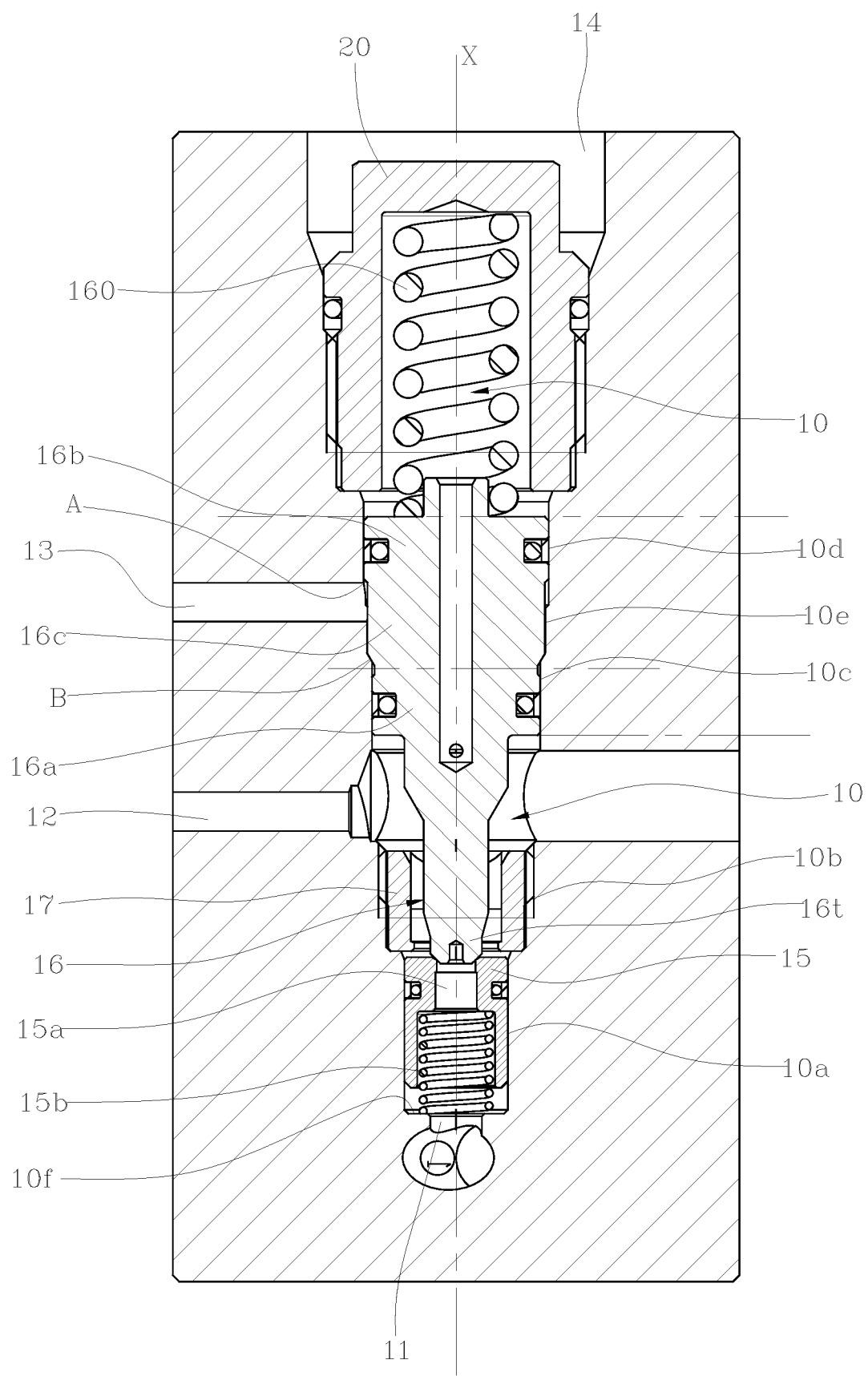

MOVEMENT CONTROL VALVE

The object of the present invention is a movement control valve of a load.

The invention relates, in particular, to the field of operating machinery designed for lifting and lowering loads.

Machines of this type normally have one or more arms that can be lifted or lowered by means of hydraulic motors, to allow handling of loads, even very heavy ones. The hydraulic motors can be, for example, hydraulic cylinders, rotary actuators or other types.

Considering, for example, a hydraulic cylinder, this comprises a hollow cylindrical body, inside which a piston or plunger is sealingly slidable. The piston is slidable along the longitudinal axis of the cylindrical body. The piston is associated with a rod, concentric to the longitudinal axis, which protrudes from the cylindrical body.

A hydraulic cylinder normally has two chambers, which are defined inside the cylindrical body and are separate from the piston. A first chamber, typically the chamber that is located on the side of the cylinder bottom, is intended to receive pressurised oil to cause exit of the rod and, for example, lifting of the load. A second chamber, arranged on the side of the cylinder rod, and therefore annular-shaped, is arranged to receive oil and to cause re-entry of the rod and, for example, lowering of the load.

A main distributor of the known type, usually four-way and three-position, is arranged to cause supply of the pressurised oil to the first chamber or to the second chamber and, simultaneously, to place in communication with a discharge the chamber that is not supplied with the pressurised oil.

On the line that supplies the first chamber of the cylinder, a movement control valve of the load is present. This valve, in the cylinder extension and arm lifting phase, allows the first chamber to be freely supplied, and also performs the function of supporting the load and control of emptying of the first chamber of the cylinder. In particular, the movement control valve comprises a shutter, movable within a cavity between a closed position, in which it prevents the oil flow, and at least one open position, in which it allows the oil flow. In the closed position, the shutter is in contact with a sealing seat, arranged inside the cavity, in order to prevent passage of the oil.

The movement control valve is normally a closed valve, which can be activated to open by means of a specific opening command, dependent upon a load descent command. In the absence of this opening command, the control valve remains in the closed position, except to allow a controlled discharge of oil in the presence of a pressure peak inside the first chamber.

In numerous applications, the valve opening command, i.e. the command that moves the shutter from the closed position to the open position, is a hydraulic command. In these cases, the valve is provided with at least a first pilot chamber, i.e. a chamber that transmits to the shutter a first pilot pressure, which tends to push it towards the open position or towards the closed position. An elastic means acts antagonistically to the thrust exerted by the pilot pressure to move the shutter in the opposite direction. In combination with or as an alternative to the elastic means, the valve may comprise a second pilot chamber, i.e. a chamber that transmits to the shutter a second pilot pressure that tends to push it in the opposite direction with respect to the first pilot pressure.

In the absence of a descent command, i.e. in the absence of the pilot pressure, the movement control valve remains closed and guarantees support of the load. In the presence of a descent command, which transmits the pilot pressure to the shutter, the movement control valve opens gradually, guaranteeing the possibility of obtaining a controlled descent of the load.

The pilot pressure may be taken from the line that supplies the second chamber of the cylinder, i.e. the chamber rod side, or can be taken from a pilot line dedicated to that purpose.

A quite commonly used movement control valve, known as an over-center valve or counterbalance valve, comprises three chambers, defined inside the cavity within which the shutter is slidable. Each of these chambers is defined in part by a portion of the shutter and in part by the cavity within which the shutter is slidable.

A first chamber is substantially the load support chamber. Said chamber is connected to the first chamber of the cylinder, i.e. the chamber on the bottom side.

A second chamber is substantially the oil discharge chamber. Said second chamber is connected to a conduit that allows discharge of the oil.

A third chamber is substantially the pilot chamber. Said third chamber is connected to a pilot conduit. Supply of a sufficient pressure to the pilot chamber causes movement of the shutter from the closed position to the open position. The shutter, on the other hand, is pushed towards the closed position by an elastic means, typically in the form of a spring.

In many cases, in order to solve installation, dimensional and functional problems, it is necessary for the second chamber, or discharge chamber, to be interposed between the first and the third chamber, i.e. to be interposed between the load support chamber and the pilot chamber. The invention relates, in particular, to these cases.

Movement control valves of the over-center type are substantially manufactured in two forms: cartridge or parts-in-body.

Cartridge valves comprise a body within which the shutter is slidable, and within which the abutment seat of the shutter and the other parts necessary for functioning of the valve are also contained. The body is configured to be inserted in a special cavity or seat created in the installation manifold.

A body is not envisaged in parts-in-body valves, but rather the shutter and the other parts necessary to functioning of the valve are arranged directly inside the cavity or seat created in the installation manifold. The seals necessary to functioning of the valve are therefore created on the walls of the cavity or seat.

Parts-in-body valves have reduced dimensions with respect to cartridge valves. In many cases, when the space available for installation of a valve is particularly reduced, it is necessary to use parts-in-body solutions.

The housing of a parts-in-body valve is configured to allow sealed sliding of the shutter and any other moving parts. Furthermore, the housing is configured to retain the sealing seat for the shutter. The sealing seat is defined essentially by an annular element that delimits the passage available for the oil. The sealing seat is positioned so that the shutter, in the closed position, is arranged in contact with the annular element, blocking the passage available for the oil.

The sealing seat is sealingly slidable along the housing, and can open a passage for the oil in the supply direction of the cylinder chamber, by compressing the spring under the push of the pressurised oil, while in the load holding phase, it is pushed towards an end-of-stroke position by the relative spring and by the pressure caused by the load. The end-of-stroke position is defined by a shoulder arranged inside the housing and, in that position, the seat, in contact with the piston on a sealing diameter, determines sealing of the load.

In the current valves manufactured with the second chamber, or discharge chamber, interposed between the first and the third chamber (i.e. that is interposed between the load support chamber and the pilot chamber), the creation of the housing requires a double puncturing, i.e. it is necessary to make two concentric holes starting from opposing faces of the manifold or of the valve body. This is because the shoulder defines the end of stroke of the sealing seat and other parts of the housing are undercut, if viewed from the opposite side. Making two concentric holes is a difficult process overall, particularly if it is necessary to obtain almost perfect concentricity, as in the case of a valve. Furthermore, the valve must also be mounted from two sides, introducing a part of the components through one hole and the other part of the components from the opposite side of the housing.

The object of the present invention is to offer a movement control valve of the parts-in-body type that allows the drawbacks of the current valves to be overcome.

The characteristics and advantages of the present invention will become more apparent in the following detailed description of an embodiment of the present invention, illustrated by way of non-limiting example in the attached FIG. 1, which is a cross-sectional view of the valve according to the present invention.

In the description that follows, reference will be made to use of the valve according to the present invention in combination with a hydraulic cylinder. The valve according to the present invention is nonetheless also suitable to efficiently control the movement of a load operated by a hydraulic motor of another type, such as a rotary actuator, for example.

The movement control valve according to the present invention comprises a housing (10), concentric to a longitudinal axis (X). The housing (10) has a cylindrical conformation overall, defined by sections that have a different diameter to each other.

As in parts-in-body valves of the known type, the housing (10) is formed preferably in a manifold intended to be installed in a hydraulic circuit. The manifold is provided with internal conduits and attachments, configured to allow connection to pre-established conduits of the circuit.

The housing (10) comprises a loading opening (11), an unloading opening (12), a pilot opening (13) and an installation opening (14). The openings of the housing (10) are in communication with respective internal conduits or passages, formed in the manifold in which the housing (10) is disposed.

In general, the valve according to the present invention may assume an open configuration, in which it allows the flow of oil from the loading opening (11) to the unloading opening (12), and a closed configuration, in which it prevents the flow of oil from the loading opening (11) to the unloading opening (12).

The loading opening (11) is intended to be connected to a chamber in which, in a closed configuration of the valve, the intention is to maintain a specific volume of oil, i.e. to a chamber from which the intention is to prevent a discharge of oil, except in the case of a precise command. For example, the loading opening (11) can be connected to the first chamber of a hydraulic cylinder, i.e. to the chamber that, by increasing in volume, causes extension of the cylinder rod. In the presence of a hydraulic motor of a different type, the loading opening (11) is connected to the loading opening of the hydraulic motor, i.e. to the opening that, when supplied, produces the action that lifts the load.

In the preferred but non-exclusive embodiment shown, the loading opening (11) is arranged at a bottom wall (10f) of the housing (10). Said bottom wall (10f) is substantially perpendicular to the longitudinal axis (X).

The unloading opening (12) is intended to be connected to a discharge or to a conduit towards which, in an open configuration of the valve, it is intended to direct the oil coming from the loading opening (11). The unloading opening (12) is arranged on the side wall of the housing (10).

The pilot opening (13) is intended to be connected to a pilot oil source, as will be explained below in the description. The pilot opening (13) is arranged on the side wall of the housing (10). The pilot opening (13) is separate from the unloading opening (12).

In the embodiment shown, considering a position measured along the longitudinal axis (X), the unloading opening (12) is interposed between the loading opening (11) and the pilot opening (13). In other words, proceeding along the longitudinal axis (X) from the loading opening (11) towards the inside of the housing (10), first the unloading opening (12) and second the pilot opening (13) are positioned, i.e. the distance between the unloading opening (12) and the loading opening (11) is lower than the distance between the pilot opening (13) and the loading opening (11).

The valve also comprises a sealing seat (15), sealingly slidable along the housing (10). The sealing seat (15) delimits a passage (15a) that places the loading opening (11) in communication with the unloading opening (12).

In essence, the sealing seat (15) has an annular conformation, concentric to the longitudinal axis (X), which delimits the passage (15a). Between the outer surface of the sealing seat (15) and the wall of the housing (10) a seal is created, for example by means of an annular gasket or an O-ring.

The sealing seat (15) is inserted into a first section (10a) of the housing (10).

The valve according to the present invention also comprises a shutter (16), sealingly slidable along the housing (10) between a closed position, in which it is in contact with the sealing seat (15) and blocks the passage (15a), and an open position, in which it is moved away from the sealing seat (15) and frees the passage (15a). The shutter (16) comprises a first end (16t), facing the sealing seat (15) and tapered towards it. The first end (16t) is concentric to the longitudinal axis (X) and is shaped to be arranged in contact with the edge of the passage (15a), to obtain closure of the passage (15a) itself in the closed position of the shutter (16).

The pilot pressure, coming from the pilot opening (13), exerts on the shutter (16) a push that tends to move it from the closed position towards the open position, or tends to move the shutter (16) away from the sealing seat (15). An elastic means (160) is arranged to exert on the shutter (16) a push that tends to move it from the open position towards the closed position.

The shutter (16) is also pushed towards the open position by a force generated by the pressure present at the loading opening (11), and acting on a release area (16r), known in the sector as a "relieving area", defined by the sealing diameter on which seat (15) and shutter (16) are in contact. In order for the shutter to move from the closed position to the open position, considering a nominal condition of absence of counter-pressure at the unloading opening (12), it is necessary for the push exerted by the pilot pressure acting on the relative pilot area, summed with the push exerted on the release area (16r) by the pressure at the loading opening (11), to be greater than the push exerted by the elastic means (16b).

The sealing seat (15) is pushed towards the shutter (16) by a first elastic means (15b) and by the pressure present at the loading opening (11). In the embodiment shown, the first elastic means (15b) is interposed between the sealing seat (15) and a bottom wall (10f) of the housing (10).

Advantageously, the valve according to the present invention comprises an abutment element (17), removably fixed in the housing (10). Said abutment element (17) is configured so as to define an abutment in contact with which the sealing seat (15) is disposed as a result of the push exerted by the first elastic means (15b) and the pressure present at the loading opening (11).

The arrangement of the abutment element (17) offers extremely important advantages. It does, in fact, allow an abutment to be created that offers a rest plane for the sealing seat (15), pushed by the first elastic means (15b) and the pressure present at the loading opening (11). In other words, the sealing seat (15), as a result of the push exerted by the first elastic means (15b) and the pressure present at the loading opening (11), is arranged abutting on the abutment element (17).

In the valves currently available, the abutment or counter element for the sealing seat (15) are obtained by means of a shoulder on the wall of the housing (10). Said shoulder is undercut, at least in the direction facing the installation opening (14). This means that, in the current valves, it is necessary to create a housing (10) by means of a process that requires two opposing holes concentric to the longitudinal axis (X). As already emphasised in the introductory part of this description, said process is complex and costly, given that the concentricity of the two holes must be guaranteed with considerable precision, in order not to compromise the correct functioning of the valve. In the valve according to the present invention, the housing (10) may, on the other hand, be created with one or more holes in the same direction. In fact, as will be explained below, the housing (10) may be created with two or more sections (10a, 10b, 10c, 10d), the diameter of which decreases as they proceed from the installation opening (14) towards the loading opening (11).

Furthermore, in the valves currently available, the abutment or counter element for the sealing seat (15), configured as described above, requires the shutter (16) and the sealing seat (15) to be inserted from the opposite ends of the housing (10). In many applications, especially in cases in which the available space for the valve is limited, access to the two ends of the housing (10) can be extremely difficult, or even impossible.

In contrast, in the valve according to the present invention, the introduction of all the components is through the installation opening (14) only. In particular, thanks to the arrangement of the abutment element (17), installation takes place by introducing the first elastic means (15b), the sealing seat (15), the abutment element (17) and the shutter (16) in sequence into the housing (10), through the installation opening (14).

Advantageously, the housing (10) comprises at least a first section (10a), intended to sealingly contain the sealing seat (15), a second section (10b), intended to sealingly contain the abutment element (17), and a third section (10c), intended to sealingly contain at least a first portion (16a) of the shutter (16). The diameter of the first section (10a) is smaller than the diameter of the second section (10b) and the diameter of the second section (10b) is smaller than the diameter of the third section (10c). Thanks to the conformation described above, and to the relation of inequality between the diameters of the sections (10a, 10b, 10c), the housing (10) may be created by making a first hole, of a smaller diameter, to obtain the first section (10a), followed by a second hole, of a larger diameter and through the same access of the first hole, to obtain the second section (10b), followed by a third hole, of a larger diameter than the second hole and through the same access of the first and the second hole, to obtain the third section (10c). Further sections, of a larger diameter with respect to the third section (10c), can be obtained with further holes through the same access of the previous holes.

In the embodiment shown, the shutter (16) comprises a second portion (16b), having a larger diameter than the first portion (16a). The housing (10) comprises a fourth section (10d), intended to sealingly contain said second portion (16b). The pilot opening (13) is interposed between said first and second portions (16a, 16b) of the shutter (16). In this manner, the pilot pressure remains substantially confined in a delimited zone of the seals of the first portion (16a) and of the second portion (16b) of the shutter (16).

In particular, the pilot opening (13) is arranged on an intermediate section (10e) of the housing (10). The diameter of said intermediate section (10e) is larger than or equal to the diameter of the third section (10c) and smaller than or equal to the diameter of the fourth section (10d).

In order to introduce an end of stroke downwards for the shutter, within the intermediate section (10e), in the non-limited embodiment of FIG. 1, an intermediate portion (16c) of the shutter (16) is positioned. Said intermediate portion (16c) has a diameter that is larger with respect to the first portion (16a) and smaller with respect to the second portion (16b).

The intermediate section (10e) and the intermediate portion (16c) of the shutter (16) are shaped so that an interspace that can be filled with the pilot oil forms between them. The intermediate portion (16c) of the shutter (16) comprises at least one pilot surface (A,B), shaped so that the pilot pressure exerts on it a push that tends to move the shutter (16) towards the open position, i.e. a push with a component turned upwards in FIG. 1. For example, the pilot surface (A,B) is an annular-shaped surface defined by the difference between the diameters of the first portion (16a) and of the second portion (16b).

In the embodiment shown, in which the intermediate portion (16c) is present, the pilot surface (A,B) comprises a first surface (A), defined by the difference between the diameters of the intermediate portion (16c) and of the second portion (16b), and a second surface (B), defined by the difference between the diameters of the intermediate portion (16c) and of the first portion (16a). In the embodiment shown, the second surface (B) also defines the end of stroke downwards of the shutter (16), i.e. the end of stroke towards the sealing seat (15).

In other embodiments, not shown, the intermediate portion (16c) is not present, i.e. the first portion (16a) of the shutter (16) is coupled directly to the second portion (16b). In this case, the pilot surface (A,B) is an annular-shaped surface defined by the difference between the diameters of the second portion (16b) and of the first portion (16a). In these embodiments, it is possible to create a shoulder for the end of stroke downwards of the shutter, in other sections of the shutter itself and of the housing (10), for example above the second portion (16b) or lower down with respect to the first portion (16a), making reference to FIG. 1.

In the preferred but non-exclusive embodiment shown, the abutment element (17) can be fixed in the housing (10) by means of a threaded connection. The internal threading is arranged at the second section (10b) of the housing (16). The abutment element (17) has an annular conformation. The outer surface of the abutment element (17) has a complementary threading to the internal threading of the second section (10b) of the housing (16). Thanks to use of a threaded coupling, the abutment element can be fixed in the housing (10) in a very simple manner, after introducing the sealing seat (15).

As already mentioned, a second elastic means (160) is disposed in such a way as to push the shutter (16) towards the closed position in contact with the sealing seat (15). Said second elastic means (160), for example in the form of a helical spring, is arranged in contact with a second end of the shutter (16), opposite to the first end (16t), which interacts with the sealing seat (15).

The valve according to the present invention also comprises a closure element (20), removably fixed to the housing (10) so as to close the installation opening (14). In the embodiment shown, the closure element (20) is in the form of a threaded cap, screwable to the end of the housing (10) in which the installation opening (14) is located. The second elastic means (160) is interposed between the closure element (20) and the second end of the shutter (16).

The operation of the valve takes place in the following ways.

FIG. 1 shows the valve in the closed position. The shutter (16) is maintained in the closed position by the push exerted by the second elastic means (160). Said push, in load holding conditions, is such as to exceed the push exerted by the pressure at the loading opening (11) acting on the respective abutment area. The sealing seat (15), in a rest position with low pressure at the loading opening (11), may be detached, at least slightly, from the abutment element (17), as a result of the push exerted by the first end (16t) of the shutter (16), but nonetheless maintaining the contact and the seal between the passage (15a) and the first end (16t) of the shutter (16). In conditions of normal use, a small pressure present at the loading opening (11) puts the sealing seat (15) in abutment with the element (17) which basically defines an abutment for 5 the sealing seat (15) and, at the same time, the seal on the contact point between the sealing seat (15) and the shutter (16) in the zone of the first end (16t) is guaranteed.

With the shutter (16) in the sealing position, the valve allows a one-way flow from the unloading opening (12) to the loading opening (11), with the sole condition that the pressure at the unloading opening (12) is sufficient to overcome the push exerted by the first elastic means (15b). In this condition, the sealing seat (15) detaches from the first end (16t) of the shutter (16), allowing the flow from the unloading opening (12) to the loading opening (11). This allows, for example, oil to be supplied to the chamber of the cylinder connected to the loading opening (11). An end of stroke is arranged to stop the shutter (16) in a desired position along the travel towards the loading opening (11). In the embodiment shown, the end of stroke is defined by a shoulder (B) formed on the outer surface of the shutter (16). Preferably, the shoulder (B) is arranged along the intermediate portion (16c) of the shutter (16), which couples the intermediate portion (16c) with the first portion (16a), but could be formed in other ways.

In order to allow the flow from the loading opening (11) to the unloading opening (12), it is necessary to move the shutter (16) from the closed position of FIG. 1 towards the open position, shown in FIG. 2. For this purpose, the transmission of an opening command to the shutter (16) is envisaged, through sending of a pilot pressure to the pilot opening (13). The pilot pressure is such as to exert a push, on the pilot surface (A) of the shutter (16), which exceeds the push exerted by the second elastic means (160). In these conditions, the shutter (16) moves towards the open position, detaching from the sealing seat (15), so as to allow the flow from the loading opening (11) to the unloading opening (12). In this manner, it is possible, for example, to allow an oil discharge from the chamber of the cylinder connected to the loading opening (11).

Lowering or elimination of the pilot pressure allows the shutter (16) to return to the closed position.

The shutter (16) is also pushed towards the open position by a force generated by the pressure present at the loading opening (11), and acting on the release area (16r), defined by the sealing area on which seat (15) and shutter (16) are in contact. In order for the shutter to move from the closed position to the open position, considering a nominal condition of absence of counter-pressure at the unloading opening (12), it is necessary for the push exerted by the pilot pressure acting on the pilot surface (A), summed with the push exerted by the pressure at the loading opening (11) on the release area (16r), to be greater than the push exerted by the elastic means (160).

The invention claimed is:

1. A movement control valve of the parts-in-body type, comprising:
   a housing (10), concentric to a longitudinal axis (X), which comprises a loading opening (11), an unloading opening (12), a pilot opening (13) and an installation opening (14);
   a sealing seat (15), sealingly slidable along the housing (10), which delimits a passage (15a) that places the loading opening (11) in communication with the unloading opening (12);
   a shutter (16), sealingly slidable along the housing (10) between a closed position, in which it is in contact with the sealing seat (15) and blocks the passage (15a), and an open position, in which it is moved away from the sealing seat (15) and frees the passage (15a);
   a first elastic means (15b), disposed in such a way as to push the sealing seat (15) towards the shutter (16); and
   an abutment element (17), removably fixed in the housing (10) and configured so as to define an abutment in contact with which the sealing seat (15) is disposed as a result of the push exerted by the first elastic means (15b) and the pressure present at the loading opening (11),
   wherein the housing (10) comprises at least a first section (10a), intended to sealingly contain the sealing seat (15), a second section (10b), intended to sealingly contain the abutment element (17), and a third section (10c), intended to sealingly contain at least a first portion (16a) of the shutter (16), wherein the diameter of the first section (10a) is smaller than the diameter of the second section (10b) and the diameter of the second section (10b) is smaller than the diameter of the third section (10c).

2. The valve according to claim 1, wherein:
   the shutter (16) comprises a second portion (16b), having a larger diameter than the first portion (16a), and wherein the housing (10) comprises a fourth section (10d), intended to sealingly contain said second portion (16b);
   the pilot opening (13) is interposed between said first and second portions (16a, 16b) of the shutter (16).

3. The valve according to claim 1, wherein the unloading opening (12) is interposed between the loading opening (11) and the pilot opening (13).

4. The valve according to claim 1, wherein the abutment element (17) is fixed in the housing (10) by means of a threaded connection.

5. The valve according to claim 1, wherein the abutment element (17) has an annular shape.

6. The valve according to claim 1, comprising a second elastic means (160), disposed in such a way as to push the shutter (16) towards the closed position in contact with the sealing seat (15).

7. The valve according to claim 1, comprising a closure element (20), removably fixed to the housing (10) so as to close the installation opening (14).

8. The valve according to claim 7, wherein the second elastic means (160) is interposed between the closure element (20) and one end of the shutter (16).

9. The valve according to claim 1, wherein the first elastic means (15b) is interposed between the sealing seat (15) and a bottom wall (10f) of the housing (10).

10. The valve according to claim 1, wherein installation takes place by introducing the sealing seat (15), the abutment element (17), the shutter (16) in sequence into the housing (10) through the installation opening (14).

\* \* \* \* \*